United States Patent [19]

Forest

[11] 3,793,527
[45] Feb. 19, 1974

[54] METHOD FOR ANALYZING RARE EARTH-ACTIVATED RARE EARTH OXIDE AND OXYSULFIDE PHOSPHORS

[75] Inventor: Harvey Forest, Skokie, Ill.

[73] Assignee: Zenith Radio Corporation, Chicago, Ill.

[22] Filed: Nov. 2, 1972

[21] Appl. No.: 303,298

[52] U.S. Cl. .................................. 250/459, 250/61
[51] Int. Cl. ........................................... G01n 21/38
[58] Field of Search ... 250/365, 458, 459, 461, 483, 250/484

[56] References Cited
UNITED STATES PATENTS 3,617,743   11/1971   Rabatin et al. ................. 250/483 X Primary Examiner—Archie R. Borchelt
Attorney, Agent, or Firm—John H. Coult

[57] ABSTRACT

This disclosure depicts a method for quickly and accurately determining the emission color and activator content of rare earth-activated rare earth oxide and oxysulfide phosphors such as $Y_2O_2S$:Eu. The method involves exciting the tested phosphor by ultra-violet irradiation or other suitable stimulation, detecting the intensities of predetermined spectral lines in the emission spectrum of the excited phosphor, and comparing the related intensities of the detected lines to derive an indication of the emission color and activator content of the phosphor.

22 Claims, 2 Drawing Figures

METHOD FOR ANALYZING RARE EARTH-ACTIVATED RARE EARTH OXIDE AND OXYSULFIDE PHOSPHORS

BACKGROUND OF THE INVENTION

Makers of color television picture tubes have recently initiated large scale usage of light-emitting phosphors of the rare earth-activated rate earth oxysulfide class. An important example of such a phosphor is europium-activated yttrium oxysulfide, a red-emitting phosphor of increasing commercial significance. The emission spectra of these phosphors are characterized by extremely narrow emission lines. Because of the high degree of difficulty encountered in ascertaining the emission color of phosphors having narrow emission lines, the introduction into commercial use of such phosphors has engendered a great need for fast and accurate methods of determining their emission color.

It is well known that the emission color and brightness of the $Y_2O_2S$:Eu phosphor depends to a high degree upon the concentration of the europium activator. The color coordinates on a tristimulus color diagram of $Y_2O_2S$:Eu with different europium concentrations exhibit the well-known shift of emission color from yellow to red with increasing europium concentration.

This emission color shift has been attributed to the sequential quenching of the $^5D_2$, $^5D_1$ and $^5D_0$ emitting states. The emission spectrum of $Y_2O_2S$:Eu consists of many narrow lines from all three of these emitting states, resulting in a composite emission color. The dominant emissions from $^5D_2$ fall in the blue-green region, from $^5D_1$ in the green-yellow region, and from $^5D_0$ in the yellow-red region. Thus, as the $^5D_2$ and $^5D_1$ emissions are sequentially quenched with increasing europium concentration, the emission color becomes progressively more red. At commercial europium concentration levels, typically in the order of 3.6 mole per cent, the $^5D_2$ emissions do not contribute significantly and the emission color of the phosphor is determined primarily by the relative strengths of the $^5D_1$ and $^5D_0$ emissions.

In spite of the strong need for quick, simple and accurate methods of determining the emission color of rate earth-activated rare earth oxysulfide phosphors, there presently exists no practically useful methods. Conventional colorimetric techniques involving the use of a combination of a number of wideband filters are not sufficiently accurate to analyze narrow-line emitting phosphors.

Due to the lack of a fast and reliable emission color test, many television color tube makers are forced to rely on a subjective visual inspection test. Visual inspection of the emission color of these oxysulfide phosphors has proven to be unsatisfactory, this method being extremely subjective, unreliable and prone to errors induced, inter alia, by intensity differences in the tested phosphor samples.

A third method which is used in analytical chemical laboratories, but which has little practical utility for on-line factory inspections, involves the use of a sophisticated spectrometer coupled to a computer. The spectrometer scans the entire phosphor emission spectrum and produces a spectrograph while the computer develops an integrated intensity characteristic of the detected spectrum. For accurate determinations the spectrometer-computer is typically set to sample the spectrum through a band-pass approximately 5 angstroms wide. Assuming an emission spectral range for the tested phosphor of 2,000 angstroms or more, it can be seen that the instrument must take and analyze at least 400 samples, a time-consuming and costly operation.

The overall time required to perform the spectrometric-computing method is due to a great extent to the setup procedures required. Since the spectrometer-computer scans the total emission spectrum of the tested phosphor, the complete spectrum must be free from spectral lines generated by foreign sources. A consequence of this constraint is that the phosphor to be tested must be excited to emission by a cathode ray bombardment under conditions which closely approximate the operating conditions of a cathode ray tube. Before a color emission test on a batch of phosphor can be performed, the phosphor must be deposited within a vacuum bottle and established in a vacuum environment, much as it would be in an assembled color tube, before the test can begin. The described setup procedures typically consume 3-4 hours or more. Further, whereas the described spectrometer-computer is capable of developing data which may be useful to the particular laboratory involved, the results are commonly incapable of being correlated reliably with data taken by different instruments in other laboratories.

In spite of the complexity and cost of the operation, and the relatively great time consumption, the results developed by this method are not extremely accurate due to the difficulties which exist in maintaining the intensity of the phosphor emission constant over the time required to scan its emission spectrum.

As may be expected, since there did not exist prior to this invention an accurate and reliable method susceptible to standardization for measuring the emission color of rare earth-activated rare earth oxysulfide phosphors, practical problems have developed in the supply of such phosphors by phosphor vendors to the tube makers. Specifications on emission color developed by tube makers often have not been met by the phosphor vendors to the satisfaction of the tube makers.

OBJECTS OF THE INVENTION

It is a general object of this invention to provide a method for quickly and accurately determining the emission color of rare earth-activated rare earth oxide and oxysulfide phosphors.

It is another object to provide such a method which is repeatable with similar results, which is capable of being standardized independently of spectrometric equipment and laboratory procedures employed, and which may be carried out reliably by relatively untrained personnel and with relatively inexpensive spectrometric equipment.

It is still another object of this invention to provide a method for determining with a high degree of accuracy the activator concentration in a sample of rare earth-activated rare earth oxide or oxysulfide phosphors.

It is yet another object to provide a method for determining the emission color of or activator concentration of rare earth-activated rare earth oxide or oxysulfide phosphors which does not require excitation by cathode ray bombardment, but which can be performed by the use of UV (ultra-violet) irradiation.

DESCRIPTION OF THE PREFERRED EMBODIMENTS

It is extremely important that the emission characteristics of television picture tube phosphors be capable of accurate predetermination, in order that the color contrast, brightness and color balance of the three primary color phosphors be proper. Because of its relatively high luminous efficiency and favorable spectral properties, the rare earth-activated rare earth oxysulfide phosphor, $Y_2O_2S$:Eu, has recently gained widespread use in color television tubes. Other such phosphors may gain commercial acceptance in the future.

Figure 1:
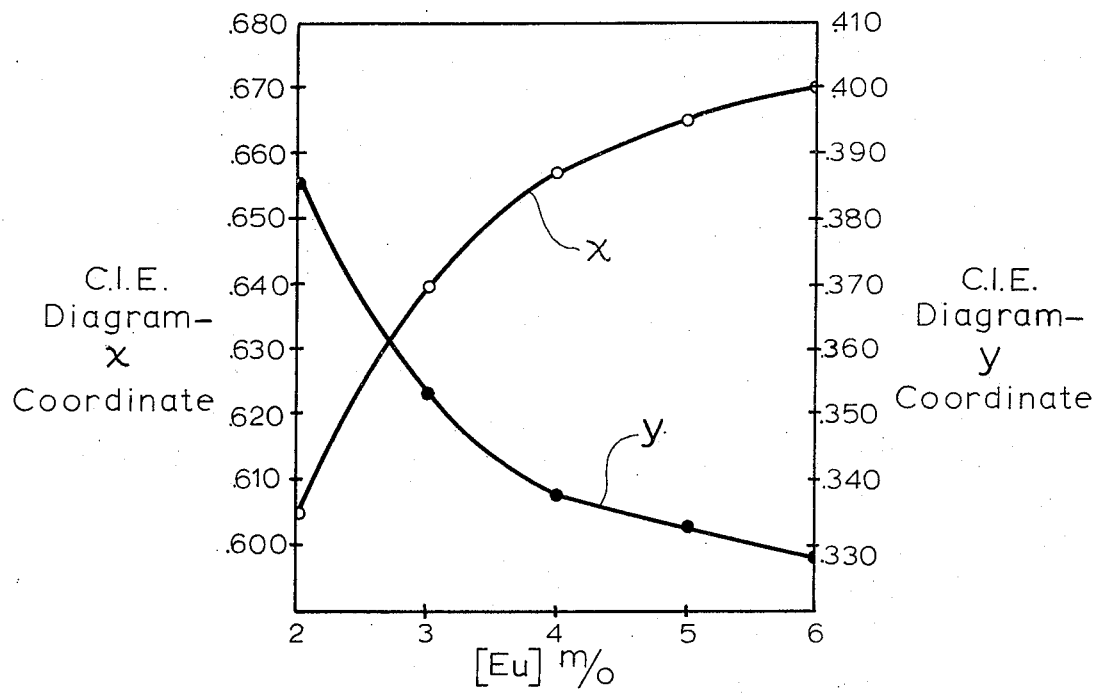
FIG. 1 is a graph illustrating the shift in emission color of the emission spectra of europium-activated yttrium oxysulfide phosphor as the europium concentration is changed.

FIG. 1 illustrates, in terms of the $x$ and $y$ coordinates of a C.I.E. (Commission Internationale de l'Eclairage) color diagram, the variation in the emission color of yttrium oxysulfide ($Y_2O_2S$:Eu) as a function of its europium content. In spite of a long felt need, there did not exist prior to this invention a quick, accurate and otherwise satisfactory method for ascertaining the emission color of $Y_2O_2S$:Eu or other rare earth-activated rare earth oxysulfide phosphors, nor, secondarily, their concentration of europium (or other activator).

This invention is directed to a method for determining the emission color of a sample of rare earth-activated rare earth oxysulfide phosphor and/or its activator content, which comprises basically the following steps. First, the phosphor is excited to stimulate light emission. Secondly, the intensities of predetermined spectral lines in the emission spectrum of the excited phosphor are detected. Thirdly, the relative intensities of the detected spectral lines are compared to derive an indication of the emission color and/or the activator content of the phosphor.

In more detail, the tested phosphor is preferably excited by UV (ultra-violet) irradiation. Although the sample may be excited by electron bombardment, by irradiation with X-rays or high energy radiation, the use of UV irradiation is preferred for reasons of simplicity, low cost, and speed and convenience in the testing procedure (described below). For reasons which will become more apparent as this discussion continues, whereas UV stimulation is not possible in certain prior art methods, it may be employed in the method of this invention since contamination of the emission spectrum by the spectrum of the UV lamp used to excite the phosphor does not degrade the results obtained.

An important basis for the present method centers upon the discovery that the intensities of a certain few lines in the entire emission spectrum of certain rare earth-activated rare earth phosphors contains sufficient information, if correlated properly, to indicate very accurately the emission color and also the activator content of the excited phosphor sample. It was also discovered that the line intensity peak height only need be detected; it is not necessary to ascertain intensity integrated over the breadth of the spectral lines of interest.

It is an important aspect of the subject method that one or more selected lines from each of a plurality suitable emission manifold be detected for subsequent comparison of relative intensity. Whereas a variety of spectral lines within these manifolds may be selected to implement the principles of this invention, in the interest of conserving test time, it is preferable that the selected spectral lines in the chosen emission manifolds be located close together in the emission spectrum of the phosphor.

Secondly, it is important also that the selected lines not be adulterated by spectral lines produced by the source of UV excitation.

To the end of satisfying these stated criteria, and considering the phosphor $Y_2O_2S$:Eu, it is preferable that the spectral lines selected for comparison are the lines associated with the $^5D_1 \rightarrow {}^7F_3$ and $^5D_0 \rightarrow {}^7F_0$ transitions. As a result of the spectral overlap of the $^5D_0$ and $^5D_1$ emission manifolds which characterize the europium activator, the $^5D_1 \rightarrow {}^7F_3$ and $^5D_0 \rightarrow {}^7F_0$ transitions occur quite close together on the spectrum, namely between 5,800 Å and 5,900 Å. Thus to detect lines associated with these transitions it is necessary only to scan this very narrow (100 A) band of wavelengths in the emission spectrum of the phosphor.

Also, the lines associated with the $^5D_1 \rightarrow {}^7F_3$ and $^5D_0 \rightarrow {}^7F_0$ transitions are desirable for their freedom from interference from lines generated by UV lamps and from other emissions from the phosphor being tested.

The $^5D_0 \rightarrow {}^7F_0$ transition is unsplit by the crystal field, with the result that this emission occurs as a narrow singlet. However, the $^5D_1 \rightarrow {}^7F_3$ transition can be resolved into several emission lines. In experiments conducted on $Y_2O_2S$:Eu following the method of this invention, a Jarrell-Ash 0.25 $m$ monochrometer having a 6 A bandpass was used. This instrument resolved the $^5D_1 \rightarrow {}^7F_3$ transition into two emission lines. Either of these $^5D_1 \rightarrow {}^7F_3$ transition lines may be employed to carry out the method of this invention. The two emission lines associated with the $^5D_1 \rightarrow {}^7F_3$ transitions were found to occur at approximately 5,865 Å and 5,885 Å. The $^5D_0 \rightarrow {}^7F_0$ transition was found to occur at approximately 5,830 Å.

In a third basic step of the subject method, the relative intensities of the spectral lines detected in the chosen emission manifolds are compared to derive an indication of the emission color and/or the activator concentration in the phosphor sample. As applied to $Y_2O_2S$:Eu, it is preferred, in the interest of simplicity and ease of test operations, that the line intensity peak height as a measure of the line intensity of the $^5D_0 \rightarrow {}^7F_0$ emission line be compared with the line intensity peak height as a measure of the line intensity of either of the above-described $^5D_1 \rightarrow {}^7F_3$ emission lines to develop a line intensity peak height ratio (hereinafter LIR). It has been found that this LIR completely describes the emission color and also the europium content of the tested phosphor.

Figure 2:
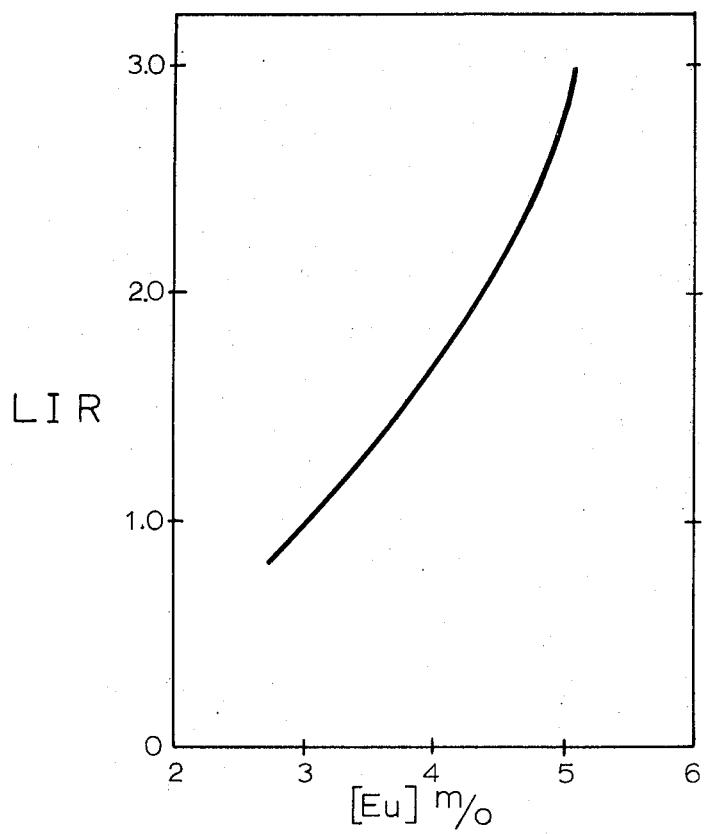
FIG. 2 is a calibration curve developed according to the method of this invention which illustrates the relationship between line intensity ratio and europium concentration.

FIG. 2 is a curve illustrating line intensity peak height rations (LIRs) of the $^5D_0 \rightarrow {}^7F_0$ line to the 5,865 Å $^5D_1 \rightarrow {}^7F_3$ emission line of $Y_2O_2S$:Eu as a function of europium concentration.

Because a ratio of line intensity values is developed as the description of emission color and europium concentration, rather than an absolute intensity measurement, no corrections for spectral sensitivity of the monochrometer or calibrations need be made at any time since any errors or shifts introduced in the measurement of peak intensity of one line will be substantially equal in measurement of the other line, thus canceling any effect thereof.

FIG. 2 and the operations performed to develop the FIG. 2 curve will not be discussed in detail. A series of $Y_2O_2S$:Eu phosphor were prepared with varying Eu concentration from 2.5 to 6 mole per cent by the usual $Na_2CO_3 + S$ flux synthesis procedure which directly converts $Y_2O_3$:Eu into $Y_2O_2S$:Eu with greater than 99 per cent yield. The $^5D_0/^5D_1$ LIR (line intensity peak height ratio) was measured as described above and plotted (closed circles) in FIG. 2 versus europium concentration in mole per cent. A smooth curve was able to be drawn through the points. Reproducibility of the LIR for different samples at the same europium concentration was found to be ± 3 per cent.

Using the FIG. 2 curve as a working calibration curve, it is a quick and simple operation to determine quantitatively how close the emission color of a particular sample of europium-activated yttrium oxysulfide phosphor agrees with a standard color. The LIR's of $Y_2O_2S$:Eu phosphors used by known commercial color tube makers fall generally in the range of 1.0 to 1.5, corresponding to europium concentrations in the range of about 3 to somewhat less than 4 mole per cent. A useful relationship between LIR and color coordinates (not shown) can be obtained, if desired, by combining FIGS. 1 and 2.

The curve in FIG. 2 may also be used as a very accurate analytical method for determining europium concentration in $Y_2O_2S$:Eu phosphors. The accuracy of this method of determining europium concentration is about 0.05 per cent in the range of 2–6 mole per cent.

It is possible to extend the testable europium concentration range to higher or lower concentrations.

Thus this invention makes possible the fast and accurate testing of rare earth-activated rare earth oxysulfide and oxide phosphors to determine emission color, and if desired, the tristimulus color coordinates thereof, and also to determine the concentration level of the rare earth activator thereof. For the phosphor maker who must be able to manufacture phosphors to meet given color emission specifications, a calibration curve is preferably made. If the specification is in terms of LIR, a curve as described above and shown in FIG. 2, may be used. The exact LIR desired can then be predetermined by selection of an appropriate europium concentration level. If a specification of color emission is made in terms of CIE coordinates, e.g., rather than in LIR, a conversion may be made by the use of a curve such as is shown in FIG. 1.

The above-described method has been particularized in connection with analysis of yttrium oxysulfide phosphors activated by trivalent europium. The principles of this invention will apply equally to analysis of rare earth-activated rare earth phosphors other than yttrium oxysulfide. A general group of phosphors which may be analyzed by the method of this invention may be described as:

$Ln_2(O_{3-x}S_x)$:RE, where $x = 1$ or 0, where RE represents the following group of elements:

Tb — Terbium
Sm — Samarium
Dy — Dysprosium
Ho — Holmium
Er — Erbium
Tm — Thulium
Pr — Praseodymium
Eu — Europium
Gd — Gadolinium
Nd — Neodymium; and where Ln represents the following group of elements:

La — Lanthanum
Lu — Lutecium
Y — Yttrium
Gd — Gadolinium and solid solutions of one or more of these.

Whereas the foregoing description of the invention has been made primarily in the context of rare earth-activated rare earth oxysulfide phosphors, it can be seen from the above generalized expression $Ln_2(O_{3-x}S_x)$:RE that $x$ may equal 0, in which case the sulfur constituent drops out. Thus, the invention in its most general conception, encompasses rare earth-activated rare earth oxides, as well as oxysulfides.

Further, as briefly noted above, whereas the emission manifolds most suitable for the selection of lines for comparison are the $^5D_0$ and $^5D_1$ manifolds for the europium activator, if other of the above-listed activators are employed, other emission manifolds may be more suitable. In selecting the most suitable emission manifolds and intro-manifold lines for a given activator, the following considerations are important: 1) the relative intensity of the emission manifold and its lines; 2) its overlap with other emission manifolds and the availability in the region of overlap of otherwise suitable lines from the different manifolds; and 3) the presence or absence of interfering emission lines or lines from foreign sources.

The invention is not limited to the particular details of construction of the embodiments depicted and other modifications and applications are contemplated. Certain changes may be made in the above described methods and apparatus without departing from the true spirit and scope of the invention herein involved and it is intended that the subject matter in the above depiction shall be interpreted as illustrative and not in a limiting sense.

I claim:

1. A method for determining the emission color of the phosphor $Ln_2(O_{3-x}S_x)$:RE, where RE represents an element selected from the group consisting of terbium, samarium, dysprosium, holmium, erbium, thulium, praseodymium, europium, gadolinium and neodymium, and where Ln represents an element selected from the group consisting of lanthanum, yttrium, gadolinium and lutecium and solid solutions of one or more of these, comprising:

exciting the phosphor to cause light emission;

detecting the intensities of predetermined spectral lines in the emission spectrum of the excited phosphor; and comparing the relative intensities of the detected lines to derive an indication of the emission color of the phosphor.

2. The method defined by claim 1 wherein the intensity peak heights of the predetermined emission lines are detected and compared.

3. A method for determining the emission color of a rare earth-activated rare earth oxysulfide phosphor, comprising:
   exciting the phosphor to cause light emission;
   detecting the intensities of predetermined spectral lines in the emission spectrum of the excited phosphor; and
   comparing the relative intensities of the detected lines to derive an indication of the emission color of the phosphor.

4. The method defined by claim 3 wherein said phosphor is selected from the group of phosphors consisting of europium activated yttrium oxysulfide, gadolinium oxysulfide, lutecium oxysulfide, lanthanum oxysulfide and solid solutions of one or more of these.

5. The method defined by claim 4 wherein said predetermined spectral lines comprise at least one line each from the manifold of lines associated with $^5D_1$ and $^5D_0$ transitions.

6. The method defined by claim 3 wherein the intensity peak heights of the predetermined emissions are detected and compared.

7. A method for determining the emission color of a phosphor selected from the group consisting of $Y_2O_2S{:}Eu$, $La_2O_2S{:}Eu$, $GD_2O_2S{:}Eu$ and $Ln_2O_2S{:}Eu$ and solid solutions of these, comprising:
   exciting the phosphor with ultra-violet irradiation to cause light emission;
   detecting the intensity peak height of predetermined spectral lines in the emission spectrum of the excited phosphor, said lines comprising at least one each associated with the $^5D_0$ and $^5D_1$ manifolds; and
   comparing the relative intensity peak height of the detected lines associated with the $^5D_0$ and $^5D_1$ manifolds to derive an indication of the emission color of the phosphor.

8. The method defined by claim 7 wherein said predetermined spectral lines are proximate in the emission spectrum of the said phosphor.

9. A method for determining the emission color of europium-activated yttrium oxysulfide phosphor, comprising:
   exciting the phosphor with ultra-violet irradiation to cause light emission;
   detecting the peak intensities of predetermined spectral lines in the emission spectrum of the excited phosphor, said lines comprising at least one each associated with the $^5D_0$ and $^5D_1$ manifolds; and
   comparing the relative intensity peak heights of the detected lines in the $^5D_0$ and $^5D_1$ manifolds to derive an indication of the emission color of the phosphor.

10. The method defined by claim 9 wherein said predetermined spectral lines are proximate in the emission spectrum and have corresponding intensity peak heights.

11. The method defined by claim 10 wherein said emission lines are associated with the $^5D_0 \rightarrow {}^7F_0$ and $^5D_1 \rightarrow {}^7F_3$ transitions.

12. The method defined by claim 11 wherein said predetermined emission lines comprise the $^5D_0 \rightarrow {}^7F_0$ line and one of the multiple lines associated with the $^5D_1 \rightarrow {}^7F_3$ transitions.

13. A method for determining the concentration of the activator in a rare earth-activated rare earth oxide or oxysulfide phosphor, comprising:
   exciting the phosphor to cause light emission;
   detecting the intensities of predetermined spectral lines in the emission spectrum of the excited phosphor; and
   comparing the relative intensities of the detected lines to derive an indication of the activator concentration in the phosphor.

14. The method defined by claim 13 wherein said phosphor is selected from the group of phosphors consiting of europium-activated yttrium oxysulfide, gadolinium, lanthanum oxysulfide and solid solutions of one or more of these.

15. The method defined by claim 14 wherein said predetermined spectral lines comprise at least one line each from the family of lines associated with $^5D_1$ and $^5D_0$ transitions.

16. The method defined by claim 13 wherein the intensity peak heights of the predetermined lines are detected and compared.

17. A method for determining the europium concentration in a phosphor selected from the group consisting of $Y_2O_2S{:}Eu$, $La_2O_2S{:}Eu$, $Gd_2O_2S{:}Eu$ and $Lu_2O_2S{:}Eu$ and solid solutions thereof, comprising:
   exciting the phosphor with ultra-violet irradiation to cause light emission;
   detecting the intensity peak height of predetermined spectral lines in the emission spectrum of the excited phosphor, said lines comprising at least one each associated with the $^5D_0$ and $^5D_1$ manifolds; and
   comparing the relative intensity peak height of the detected lines associated with the $^5D_0$ and $^5D_1$ manifolds to derive an indication of the europium concentration in the phosphor.

18. The method defined by claim 17 wherein said predetermined spectral lines are proximate in the emission spectrum of the said phosphor.

19. The method defined by claim 17 wherein said predetermined emission lines comprise the $^5D_0 \rightarrow {}^7F_0$ line and one of the multiple lines associated with the $^5D_1 \rightarrow {}^7F_3$ transitions.

20. A method for determining the europium concentration of europium-activated yttrium oxysulfide phosphor, comprising:
   exciting the phosphor with ultra-violet irradiation to cause light emission;
   detecting the peak intensities of predetermined spectral lines in the emission spectrum of the excited phosphor, said lines comprising at least one each associated with the transitions $^5D_0$ and $^5D_1$; and
   comparing the relative intensity peak height of the detected lines in the $^5D_0$ and $^5D_1$ transitions to derive an indication of the europium concentration in the phosphor.

21. The method defined by claim 20 wherein said predetermined spectral lines are proximate in the emission spectrum and have corresponding intensity peak heights.

22. The method defined by claim 21 wherein said emission lines are associated with the $^5D_0 \rightarrow {}^7F_0$ and $^5D_1 \rightarrow {}^7F_3$ transitions.

* * * * *